United States Patent
Comfort, III et al.

(10) Patent No.: US 12,043,799 B2
(45) Date of Patent: Jul. 23, 2024

(54) PROCESS FOR EXTRACTING CRUDE OIL FROM DIATOMACEOUS EARTH

(71) Applicant: TRC OPERATING COMPANY, INC., Taft, CA (US)

(72) Inventors: Charles H. Comfort, III, Taft, CA (US); Tracy D. Rogers, Taft, CA (US); Ronnie D. Rogers, Taft, CA (US); Aaron T. Rhoten, Taft, CA (US); Michael P. Doyle, Carmel, CA (US); Leland Doyle, Phoenix, AZ (US); Tyler R. Plunkett, Bakersfield, CA (US); Charles H. Comfort, IV, Bakersfield, CA (US)

(73) Assignee: TRC OPERATING COMPANY, INC., Taft, CA (US)

( * ) Notice: Subject to any disclaimer, the term of this patent is extended or adjusted under 35 U.S.C. 154(b) by 0 days.

(21) Appl. No.: 17/686,958

(22) Filed: Mar. 4, 2022

(65) Prior Publication Data
US 2022/0186122 A1    Jun. 16, 2022

Related U.S. Application Data

(63) Continuation-in-part of application No. 16/519,967, filed on Jul. 23, 2019, now Pat. No. 11,268,032.

(51) Int. Cl.
*C10G 1/04* (2006.01)
(52) U.S. Cl.
CPC ............ *C10G 1/045* (2013.01); *C10G 1/047* (2013.01); *C10G 2300/805* (2013.01)
(58) Field of Classification Search
None
See application file for complete search history.

(56) References Cited

U.S. PATENT DOCUMENTS 4,110,194 A    8/1978  Peterson et al.
4,424,112 A    1/1984  Rendall
(Continued)

FOREIGN PATENT DOCUMENTS

CN    111569825 A  *  8/2020
EP    261794          3/1988

OTHER PUBLICATIONS

International Search Report and Written Opinioin, dated Dec. 18, 2020, pp. 1-17.

*Primary Examiner* — Tam M Nguyen
(74) *Attorney, Agent, or Firm* — KARISH & BJORGUM, PC

(57) ABSTRACT

A process for extracting crude oil from a solid, oil bearing diatomaceous earth. In the process includes the step (a) of mixing crude oil-bearing diatomaceous earthwith a heated solvent such as toluene to reduce the size of the oil-bearing diatomaceous earthand release crude oil into the solvent, step (b) of adding water to the size reduced solid and solvent mixture of step (a) to yield a mixture of crude oil+solvent+ water+sized reduced diatomaceous earth, step (c) of passing the mixture of crude oil+solvent+water+sized reduced diatomaceous earthfrom step (b) through a cyclone separator to remove residual solids and to yield crude oil+solvent; and step (d) of passing the crude oil+solvent mixture of step (c) through a solvent stripper to remove solvent from the crude oil and to yield substantially diatomaceous earthand solvent free crude oil.

12 Claims, 5 Drawing Sheets

(56) References Cited

U.S. PATENT DOCUMENTS

| | | | |
|---|---|---|---|
| 4,441,984 A | 4/1984 | Guerre | |
| 4,498,971 A | 2/1985 | Angelov et al. | |
| 4,704,200 A | 11/1987 | Keane | |
| 4,722,782 A | 2/1988 | Graham et al. | |
| 5,143,598 A | 9/1992 | Graham et al. | |
| 5,948,242 A | 9/1999 | Ohsol et al. | |
| 8,920,637 B2 | 12/2014 | Massetti et al. | |
| 9,926,494 B1 | 3/2018 | Whitezell et al. | |
| 10,160,914 B2 | 12/2018 | Comfort, III et al. | |
| 10,167,218 B2 | 1/2019 | St. John et al. | |
| 10,300,406 B1 | 5/2019 | Sowerby et al. | |
| 11,268,032 B2 | 3/2022 | Comfort, III et al. | |
| 2013/0001136 A1 | 1/2013 | Adeyinka et al. | |
| 2013/0020235 A1 | 1/2013 | Filby et al. | |
| 2013/0037449 A1 | 2/2013 | Massetti et al. | |
| 2014/0034304 A1 | 2/2014 | Ralph et al. | |
| 2016/0297692 A1 | 10/2016 | Baeuerle | |
| 2018/0044595 A1 | 2/2018 | Mazyar et al. | |
| 2018/0273847 A1 | 9/2018 | Comfort, III et al. | |

\* cited by examiner

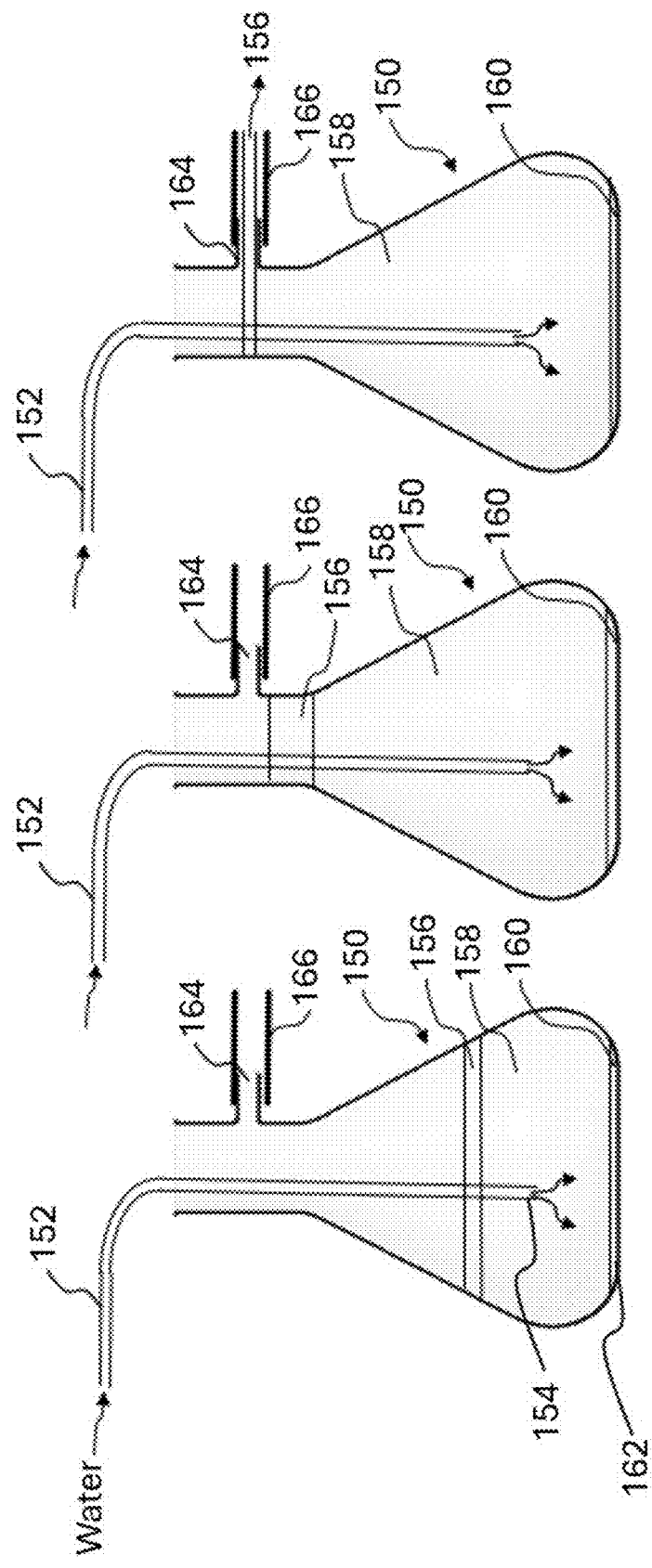

PROCESS FOR EXTRACTING CRUDE OIL FROM DIATOMACEOUS EARTH

CROSS REFERENCE TO RELATED APPLICATIONS

This is a continuation-in-part application that claims priority to prior filed patent application Ser. No. 16/519,967, filed on Jul. 23, 2019, entitled "PROCESS AND SYSTEM FOR THE ABOVE GROUND EXTRACTION OF CRUDE OIL FROM OIL-BEARING MATERIALS."

THE INVENTION

The invention relates to processes and systems for extracting of crude oil from oil-bearing material, such as diatomite formations, e.g., diatomaceous earth, and particularly to an above ground process and system where the oil-bearing material is brought to the surface and the crude oil extraction occurs above ground, rather than in situ, and without introducing any harmful chemicals into the earth when removing the oil-bearing material from the formation and without leaving any remaining harmful chemicals into the formerly oil-bearing material, thus allowing such oil stripped and harmful chemical free material to be reintroduced to the formation.

BACKGROUND OF THE INVENTION

It is known that many hydrocarbon reserves currently available are represented by oil sands, oil rocks, oil shales, and diatomaceous formations containing the so-called non-conventional oils, i.e. extra heavy oils or tars. Non-conventional oils have an extremely high density (lower than 10° API (American Petroleum Institute)) and a very high viscosity (higher than 10,000 cps) and, consequently, do not flow spontaneously under the reservoir conditions. Their exploitation is therefore linked to intrinsically high costs for the mining and production set-up of the reservoirs which must be assisted by the application of costly technologies. Mining and production set-up technologies of these reservoirs and for the extraction of said non-conventional oils are known in the art.

The prior art has many examples of using solvents to extract crude oil from diatomite. A large number of these processes attempt to treat the diatomite rock in situ or in place. However, since these methods have first come into practice, there have been new discoveries about the impact of injecting solvents underground which can have a serious effect on water supplies, particularly those closer to the surface. It is no longer considered environmentally safe to inject solvents like turpentine and naphtha underground under pressure to recover oil let alone using heat and steam to make the solvent hot underground. Too much of the solvent is left in the ground and can potentially enter the water supply. Thus, all prior art using this method is no longer a viable option for oil extraction from diatomite.

Other prior art methods took diatomite material that had hydrocarbons trapped within it and made pellets or solids on the surface and then extracted the hydrocarbons using devices including centrifugal extractors. Although effective at oil removal, it was very expensive to mold tons of diatomite ore into pellets. To make the pellets mechanically stable requires substantial pressure. The higher in pressure the diatomite was exposed to the lower the pore sizes and the lower the recovery rate of oil. In addition to high capital costs, typical systems using this approach had to deal with oil recoveries ranging from 70% to 85% of the total amount of oil present in the diatomite. Substantial solvent material was left in the pellets, which makes them hazardous to handle. Replacing the pellets underground left water supplies once again exposed to possible solvent contamination and a risk of long term leaching of solvent and oil into the ground and surrounding aquifers.

Another prior art method heated the diatomite formations or injected high pressure steam to raise the temperature sufficiently to get flow of oil in situ and then attempt recovery underground, separating oil and condensed water at the surface. This method did not address the replacement of large volumes of materials removed from underground and was prone to issues of subsidence and long term leaching of low boiling point components coming from the diatomite. Attempts to reinject water to replace the lost oil volumes were unpredictable and in general may have led to long term subsidence in these zones.

Non-conventional oils can also be extracted, for example, by strip mining, a process which requires the use of excavation and transport machinery which allow mining on different quarry faces. In this case, the mining is carried out by the recession of a single step (or quarry face), or stripping by descending horizontal sections. Strip mining is also used for reservoirs situated at a few tens of meters of depth. The material obtained by strip mining is normally subjected to grinding in order to break the physicochemical bonds between its constituents and to limit the cohesion between them, and, at the same time, to increase the overall effective surface, meaning the surface of said material which will be subsequently exposed to the action of the extraction solvent. In this way, stony rock (e.g., quartz sandstone with slightly cemented bitumen) becomes loose rock, or "earth." This grinding is normally carried out at a temperature (generally lower than or equal to 150° C.) which does not cause aggregation phenomena of the bituminous substance present in said material, and allows particles (i.e., tailings) to be obtained, having the particle size of sand (<2 mm). Hot water is added to the particles thus obtained, together with optional chemical additives in order to form a slurry, which is subsequently fed to an oils extraction plant, where it is subjected to stirring. The combined action of hot water and stirring causes the adhesion of small air bubbles to the oils, forming a bitumen froth which rises to the surface and can be recovered. The remaining part can be further treated to remove the residual water and the oil sand. The oils thus extracted, which are heavier than conventional oils, can be subsequently mixed with lighter oil (liquid or gas), or they can be chemically separated and subsequently upgraded for producing synthetic crude oil.

The above process is in extremely widespread used and is diversified and is normally applied to the oil sands of Western Canada, where they emerge at surface level, or can be found at a few tens of meters of depth. In these contexts, the production of a barrel of oil requires the treatment of about two tons of oil sand, with a recovery yield of the oils from the formation equal to about 75%, said yield being calculated with respect to the total quantity of the oils present in said formation. The tailings, or particles already treated, which contain a hydrocarbon fraction which has not been removed, can be further treated until a recovery yield of said oils equal to about 90% has been reached. This process, however, cannot be used in the case of reservoirs situated at greater depths. In such cases, in situ technologies are generally applied, which are mainly aimed at reducing the oil viscosity in the reservoir, situated at a depth ranging from a few tens to thousands of meters, by the introduction of vapor, solvents and/or hot air. The extraction can be carried out, for example, by means of the cold flow process (Cold Heavy Oil Production with Sand—CHOPS) which allows the recovery of oils by pumping them directly from the sand reservoir. When the oils, even if extremely dense, are in any case able to flow, they are pumped using progressive cavity pumps.

The CHOPS process is commonly used in the reservoirs of Venezuela and Western Canada. While the CHOPS process has the advantage of being economical, a major disadvantage is a low recovery yield of oils that is equal to about 5%-6% with respect to the total quantity of the oils present in the reservoir. By removing the filters which prevent the fine particles from flowing from the reservoir towards the surface, the processing of sand associated with the oils increases considerably causing the formation of winding ducts in the subsoil and allowing an increase in the oil recovery factor (recovery yield equal to about 10% with respect to the total quantity of the oils present in the reservoir).

Another known in situ process is Cyclic Steam Stimulation (CSS). The CSS process, also known as "huff-and-puff", is based on the cyclic introduction of high-temperature (300° C. to 400° C.) steam into the reservoir, for prolonged periods (from weeks to months), to allow the vapor to heat the mineralized formation and to fluidify the oils which can thus be recovered at the surface. The CSS process, widely used in Canada, can be repeated several times on the basis of technical and economic verifications. Although it allows a good recovery of the oils, with a recovery yield equal to about 35%-40% with respect to the total quantity of the oils present in the reservoir, the CSS process is disadvantageous from an economical point of view as it has high running costs.

Another known in situ process is Steam Assisted Gravity Drainage (SAGD). The development of directed drilling techniques has allowed the SAGD process to be developed, which is based on the drilling of two or more horizontal wells at a few meters of distance in vertical with respect to each other and with an extension of kilometers with different azimuths. Steam is introduced into the upper well. The heat lowers the crude's viscosity, allowing the oil which accumulates by gravity in the lower well, to be collected and pumped to the surface.

The SAGD process, which can also be applied to the mineral mining of shallow reservoirs, is more economical that the Cyclic Steam Stimulation (CSS) process and leads to a good oil recovery yield, with yield being equal to about 60% with respect to the total quantity of the oils present in the reservoir.

Another known in situ process is the Vapor Extraction Process (VAPEX). The VAPEX process is similar to the Steam Assisted Gravity Drainage (SAGD) process, but hydrocarbon solvents are introduced into the reservoirs instead of steam, obtaining a better extraction efficiency and favoring a partial upgrading of the oils already inside the reservoir. The solvents are costly, however, and have a considerable impact on both the environment and safety of the work site (e.g., risks of fires and/or explosions).

A further known in situ process is Oil Sand Underground Mining (OSUM). Most of the tar oil reservoirs of Western Canada and almost all of those in Venezuela are situated at such depths that the application of strip mining is not economical. This technique is sometimes also applied to reservoirs situated at depths lower than 50 m. The OSUM processes, however, can have various drawbacks. For example, the OSUM process requires the use of large quantities of water which is only partly recycled and must therefore be subjected to further treatments before being disposed of. In the case of Western Canada, for example, the volume of water necessary for producing a single barrel of synthetic crude oil—SCO, is equal to 2 to 4.5 times the volume of oil produced. Furthermore, these processes are generally characterized by a low extraction yield.

Attempts have been made in the art to overcome the above drawbacks. European patent application EP 261,794, for example, describes a process for the recovery of heavy crude oil from tar sand which comprises treating said tar sand with an emulsion of a solvent in water characterized in that the emulsion contains from 0.5% to 15% by volume of solvent. Solvents which can be used for the purpose comprise hydrocarbons such as, for example, hexane, heptane, decane, dodecane, cyclohexane, toluene, and halogenated hydrocarbons such as, for example, carbon tetrachloride, dichloromethane.

U.S. Pat. No. 4,424,112 describes a process and apparatus for the extraction with solvent of tar oils from oil sands and their separation into synthetic crude oil and synthetic fuel oil which comprises mixing the oil sands with hot water to form a slurry together with the solvent (e.g., toluene), subjecting said slurry to separation so as to obtain a phase comprising solvent and dissolved tar oils and a phase comprising solid material deriving from said oil sands, separating the tar oils from the solvent, putting the tar oils thus obtained in contact with an extraction agent (e.g., methyl butyl ketone) in order to separate the tar oils into synthetic crude oil and synthetic fuel oil, recovering and re-using the solvent, water and extraction agent in the process.

U.S. Pat. No. 4,498,971 describes a process for the separate recovery of oils on the one hand and of asphaltenes and polar compounds on the other, from oil sands which comprises cooling the oil sands to a temperature ranging from −10° C. to −180° C. at which said sands behave like a solid material, grinding said solid material at said temperature to obtain relatively gross particles containing most of the sand and oil and relatively fine particles containing most of the asphaltenes and polar compounds, and mechanically separating the relatively gross particles from the relatively fine particles at said temperatures. The relatively gross particles are subjected to extraction with a solvent (e.g., pentane, hexane, butane, propane) at a temperature ranging from about −30° C. to about −70° C., in order to recover the oil. Such relatively fine particles are subject to extraction with a solvent (e.g., pentane, hexane, butane, propane) at a temperature ranging from about −30° C. to about −70° C., in order to recover the asphaltenes and the polar compounds.

U.S. Pat. No. 4,722,782 describes a process for the recovery of tar from oil sand which comprises putting the oil sand in contact with about 0.4 pounds to about 4 pounds of a hydrocarbon solvent (e.g., paraffins having from 4 to 9 carbon atoms, for example n-heptane) in order to form a slurry including solvent rich in tar and sand free of tar; adding over 0.5 pounds of water per pound of oil sand to the slurry, at a temperature ranging from about 100° F. to about 5° F. below the boiling point of the azeotropic mixture formed by the water and solvent, so as to form a mixture comprising solvent rich in tar, sand free of tar and water; introducing the mixture into a separator container; separating the solvent rich in tar from the mixture thus leaving water and a slurry comprising sand free of tar and residual quantities of solvent; stripping the residual solvent from the sand free of tar, and separating the tar from the solvent rich in tar.

U.S. Pat. No. 8,920,637 Massetti et al. discloses a process for recovering of oils from a solid matrix that comprises subjecting the solid matrix to extraction by mixing with at least one organic solvent having a boiling point lower than or equal to 160° C., operating at a temperature ranging from 5° C. to 40° C. and at atmospheric pressure (1 atm), obtaining a solid-liquid mixture, subjecting said solid-liquid mixture to separation, obtaining a liquid phase comprising the oils and the organic solvent and a solid phase comprising said solid matrix, and recovering said organic solvent from said liquid phase.

U.S. Pat. No. 4,441,984 to Guerre discloses a process for recovery of oil from oil-bearing limestone by separating the rock into a low-density fraction (which bears a high concentration of oil) and a high-density fraction (which bears a low concentration of oil), contacting only the low-density fraction with an organic solvent in an extraction zone thereby extracting the oil from the low-density fraction, and recovering the extracted oil from the organic solvent.

U.S. Pat. No. 4,110,194 to Peterson et al. discloses a process for and apparatus for extracting bituminous oil from tar sands wherein tar sands are processed into finely divided form, preferably by pressing them into sheets and flaking the sheets. The flakes are mixed with a solvent for the contained oils for a time sufficient to extract the oils. The resulting slurry is introduced beneath the surface of a body of water and the solids are allowed to settle, while the solvent containing the oil rises to the top to form a liquid phase above the surface of the body of water. The wet solids and the oil-containing solvent are separately removed. After the oil is recovered from the solvent, as by fractional distillation, the solvent is recycled in the process, which is preferably carried on as a continuous operation.

U.S. Pat. No. 9,926,494 to Whitezell et al. discloses a method for recovering hydrocarbons from resources comprising diatomite that uses solvent to remove crude oil from a water slurry with diatomaceous earth and then removing the solvent with distillation.

Some of the inventors herein, also co-inventors on U.S. Pat. No. 10,160,914 for a process and system for above ground crude oil extraction, discloses use of centrifugation to extract oil from a mixture of crude oil, water and solids.

The processes described above, however, also have various drawbacks such as, for example: the use of water which, also in this case, as only a small part of it is recycled, must be treated before disposal; a high energy consumption (e.g., heat); the high content of fine particles having a particle size lower than or equal to 65 micron present in the oils extracted which therefore require further purification treatments before being subjected to upgrading.

The above prior art methods do not provide low cost and environmentally benign approaches to oil recovery from diatomite/clay formations. Furthermore, any process using high pressure high temperature solvents injected underground is potentially hazardous to operate and leaves a high risk of water contamination and long-term exposure of work crews in those fields to solvent vapors.

Thus, a better method is needed for oil recovery that is environmentally responsible and relatively low in capital and operating expense. Environmental impact needs to be addressed including how to replace the missing solids and liquids to leave behind a safe, stable underground structure with only minor impact to surface land.

SUMMARY OF THE INVENTION

In an exemplary embodiment the present invention is process for extracting crude oil from a solid, oil bearing material, namely oil bearing diatomaceous earth, comprising: (a) mixing solid, crude oil-bearing diatomaceous earth with a solvent to reduce the size of the solid, oil-bearing diatomaceous earth and release crude oil into the solvent; (b) adding water to the size reduced solid and solvent mixture of step (a) to yield a mixture of crude oil+solvent+water+ sized reduced diatomaceous earth; (c) passing the mixture of crude oil+solvent+water+sized reduced diatomaceous earth from step (b) through a cyclone separator to remove residual solids and to yield crude oil+solvent; and (d) passing the crude oil+solvent mixture of step (c) through a solvent stripper to remove solvent from the crude oil and to yield substantially diatomaceous earth and solvent free crude oil.

In another exemplary embodiment, the invention provides a process for the above ground extraction of crude oil from solid, oil bearing diatomaceous earth, comprising: (a) mixing a solid, crude oil-bearing material with a solvent under high shear mixing to reduce the size of the solid, oil-bearing diatomaceous earth and release crude oil into the solvent; (b) adding water to the high sheared and sized adding a crude oil-bearing diatomaceous earth and solvent mixture to yield a mixture of crude oil+solvent+water+sized reduced diatomaceous earth; (c) passing the mixture from step (b) through a plate clarifier to remove a majority of the sized reduced solids and to yield a mixture of crude oil, solvent and water with some residual sized reduced solids; (d) passing the mixture from step (c) through an oil-water separator to product an extracted liquid comprised of crude oil, solvent and some residual solids; (e) passing the extracted liquid from step (d) through a cyclone separator to remove remaining residual diatomaceous earth and to yield crude oil+ solvent; and (f) passing the crude oil+solvent mixture of step (e) through a solvent stripper (aka "flash tower") to remove solvent from the crude oil and to yield substantially solids and solvent free crude oil.

In yet another embodiment, the invention provides a process for the above ground extraction of crude oil from a solid, oil bearing diatomaceous earth, comprising carrying out a first wash, comprising; (a) providing a heated solvent; (b) adding a crude oil-bearing diatomaceous earth to the heated solvent and mixing the solid, oil-containing mixture to reduce particle sizes of the oil-containing material and release crude oil into the solvent; (c) allowing the now at least partially denuded of crude oil solid sized reduced diatomaceous earth to settle to the bottom of a container to thereby separate the at least partially crude oil denuded size reduced material from the crude oil carrying solvent, which crude oil carrying solvent floats above the at least partially crude oil denuded size reduced solid material; (d) removing the solvent with dissolved crude oil leaving the at least partially crude oil denuded size reduced solid material behind in the container; (e) removing any size reduced diatomaceous earth that may be carried in the solvent bearing crude oil of step (d) to yield a substantially solid-free crude oil and solvent mixture; and (f) removing the solvent from the solvent and crude oil mixture of step (e) to produce a primary batch of solvent and solid material free crude oil; and carrying out a second wash, comprising; (g) taking the at least partially denuded of crude oil size reduced solid material from step (c) plus the size reduced solid material from the solvent of step (e); (h) mixing the combined sized reduced solid materials of step (g) with a volume of solvent to form a second mixture, and heating the second mixture; (i) allowing the second mixture to settle; (j) adding a volume of water to the second mixture of step (i) and mixing thoroughly to make a third mixture; (k) discontinue mixing the third mixture of step (j) to allow the third mixture to separate into a lower further crude oil denuded size reduced solid material phase, a middle water phase, and an upper solvent and crude oil phase; (l) removing the upper solvent and crude oil phase from the lower solid phase and the middle water phase; and (m) removing the solvent from the solvent and crude oil phase of step (l) to yield a secondary batch of solvent and solid material free crude oil.

These and other features of the invention are described below.

BRIEF DESCRIPTION OF THE DRAWING

FIGS. 2A-2C are detailed diagrammatic steps and equipment used to float crude oil and solvent from oil bearing material under the first embodiment of FIG. 1.

DETAILED DESCRIPTION

Figure 1:
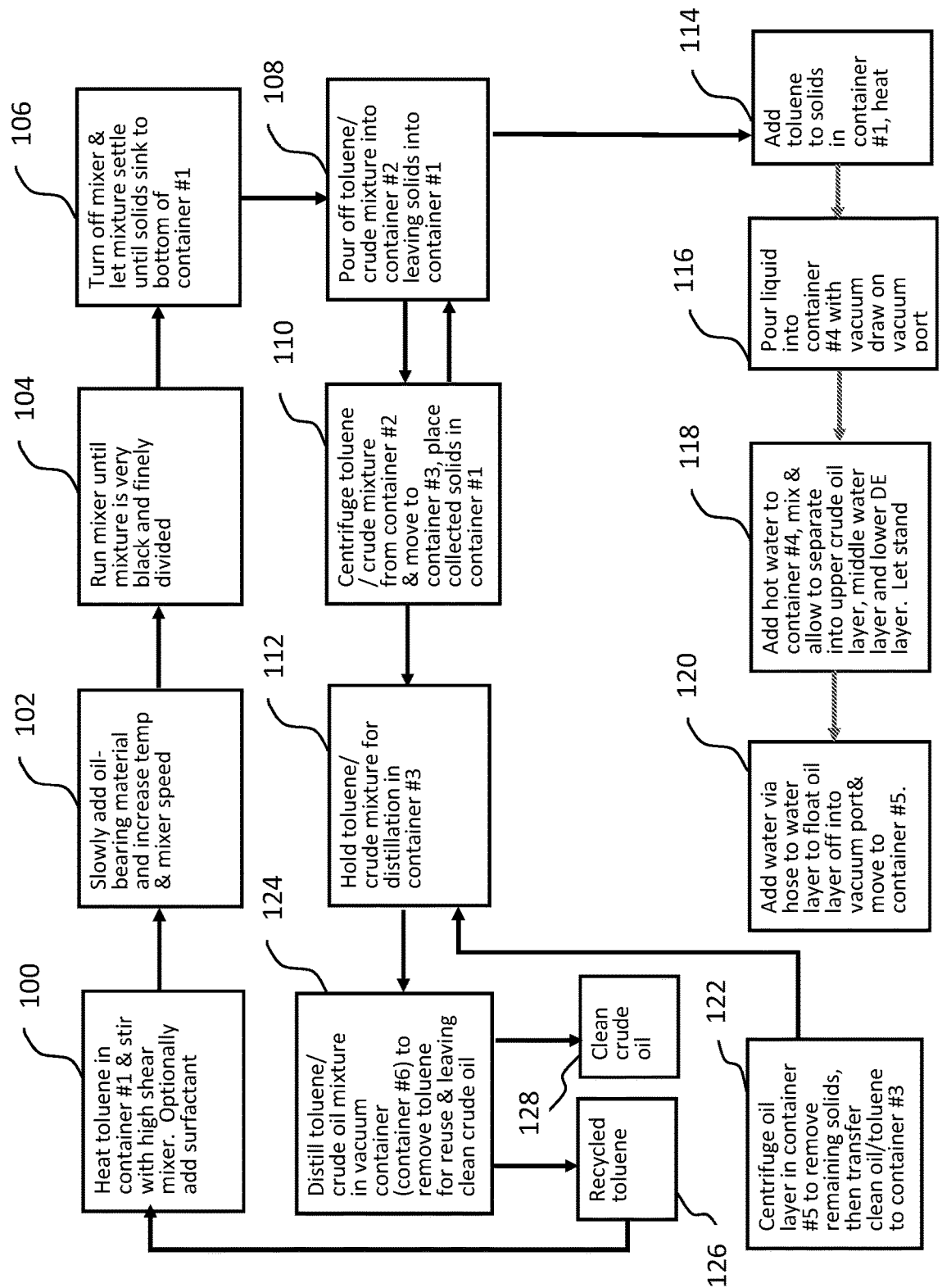
FIG. 1 is a flow chart showing the various steps of an exemplary embodiment of the invention used to remove crude oil from an oil bearing material.

The inventors have invented environmentally benign processes and systems for the above ground recovery of crude oils from oil bearing deposits and materials, particularly diatomaceous earth, or "DE". The processes and systems are particularly well-suited to recovery of crude oil from deposits initially located in subterranean formations which are brought to the surface without or substantially without the introduction of any chemicals or other potentially deleterious materials into the subterranean formation or mining site. Nevertheless, the process and system of the invention is suitable from recovering crude oil from an oil bearing material however mined.

The processes involve the recovery of crude oil from oil rich materials, such as diatomite formations that bear high percentages of oil. These diatomite formations are sometimes above ground and therefore such formations can be easily mined with known methods. More commonly, however, they are found below ground. When mined above ground, the diatomite can be ground up and mixed with water to form "muds" that are subsequently processed using the processes of the invention. Likewise, underground formations can be mined, for example, by using water jet technology. Water jets can cut into formations as large as 30' in diameter and typically at depths from 100 to 2000' below the surface. The resulting diatomite mud is pumped to the surface for oil extraction. Typically, the maximum size of the mud rocks are 3 inches to still enable the mud to be efficiently pumped to the surface. In practice, pressure and abrasion of the water jet process reduce the particle size. Further sieving, crushing or blending may be necessary to achieve uniform muds. In addition to water jet mining, open pit mining can be used to access the oil bearing DE. In addition to oil rich diatomite formations, there are other oil rich formations that can be accessed for their oil, including oil shale and tar sands formations, although the current process is optimized for recovering crude oil from DE.

The Applicant has found that using the processes and systems of the invention, the recovery of oil from oil bearing material, particularly oil bearing diatomaceous earth, can be advantageously carried out above ground to thereby avoid introducing chemicals, deleterious or not, back into the earth. Furthermore, using the process and system of the invention, the water and solvents used in the process can be readily recycled, thereby increasing efficiency and lowering fresh water usage, as fresh water is an increasingly scarce commodity. Indeed, large volumes of water are traditionally required for oil extraction, particularly for enhanced oil recovery methods, of which the invention is one example, techniques to reduce the amount of water needed can contribute to the overall economics of a project. As will be discussed below, dewatering of the oil bearing slurry of solid material+water+solvent is important as this optimizes the efficiency of the process and further allows the removed water to be recycled and reused in the process of the invention. Furthermore, restoration of the subterranean mining sites, namely by returning the crude oil reduced solids to fill subterranean voids created when solid material is removed is important as it helps prevent settling and collapse of the ground above, and also provides a final destination for the crude oil reduced solids. The steps of dewatering the slurry and returning the crude oil reduced solids to fill subterranean voids are discussed further below. Moreover, the system uses very little energy and occupies a small physical footprint compared to current recovery methods.

The various processes and technology to bring the oil bearing material above ground are well-established and are not repeated herein.

The following examples outline and describe an embodiment of the system and process of the invention to extract crude oil from oil-bearing material, viz., diatomaceous earth, in an economical and non-capital equipment intensive way.

Turning to a first exemplary process of oil recovery using overflowing water, the inventors have found that the use of a solvent, such as toluene, xylene, hexane, and heptane, and optionally with a small amount of detergent or surfactant will permit efficient separation of crude oil bearing solids into a lower solids phase, an intermediate predominately water phase, and an upper solvent+crude oil phase, with water being useful to lift off and efficiently separate the solvent+crude oil phase from the solids phase. The surfactant can comprise, for example, Nonylphenol with about 5 mols of ethylene oxide. Using this process and method, high crude oil extraction percentages can be achieved, all with use of less equipment and surprisingly in just two wash steps. The use of water to lift off and separate the solvent+crude oil phase takes advantage of gravity, since the phases have sufficient specific gravities allowing quick phase separation which will dramatically reduce the amount of solids required to be later removed. Without the use of added water to cause a phase separation allowing the crude oil+solvent (e.g., toluene) layer to rise, the crude oil+solvent will tend to stay in contact with the solids (e.g., diatomaceous earth) and high extraction percentages cannot be achieved. In addition, the added water reduces the need for additional mechanical separation techniques. The solvent, preferably toluene can be reused repeatedly, and the added process water used as the floatation medium can likewise be recycled and reused, greatly cutting down on resource requirements.

The following examples outline and describe various methodologies that proves out the first embodiment of the system and process of the invention using water to lift off and extract crude oil from oil-bearing material, in this case, diatomaceous earth soil in an economical and non-capital equipment intensive way, which is described in Example 4.

EXTRACTION EXAMPLES

Example 1

Test of Convention Crude Oil

Test 1 provides a test of convention crude oil and shows that the crude oil is substantially free of other distillates.

Place 350 grams of sample production crude oil (that is, oil recovered by conventional means such as pumping oil out of a conventional oil reserve) in 2000 ml flask in a distillation set. Start the stir bar, start the chilling water in condenser and start the vacuum. Set the heating mantle to 60° C. and vacuum is set to 28 inch gauge. Allow mixture to stabilize at 60° C. and observe if any overhead product is collected. After 15 minutes at 60° C., no distillate was observed, test ended.

Example 2

Example 2 shows that the solvent toluene can be readily removed from a mixture with crude oil. Add 200 grams of toluene to the above crude oil in the flask of Example 1. Allow to stir for 30 minutes to allow the crude oil and toluene to mix. Set heating mantle to 60° C., start chilling water to condenser and start the vacuum. Allow distillation to continue until all toluene is collected and crude is not boiling under vacuum. Raise temperature to 80° C., to collect any remaining toluene. Measure collected toluene weight in receiving flask. 155 ml was collected. Remaining 35 ml of the original 200 ml had travelled to vacuum pump, and the crude oil weight increased by about 15 grams indicating a small amount still in the crude oil.

From the results of Examples 1 and 2, it can be observed that the toluene can be collected from this particular crude allowing for the reuse of the toluene in the extraction process.

Example 3

At room temp, in a 1000 ml beaker, add 400 grams of toluene. Place beaker and toluene on stirring hot plate under high shear mixer. High shear head should have the large hole stator installed. Lower mixer in toluene such that the mixing head is about ¼ to ½ inch above bottom of beaker, also, mixing head should be submerged in toluene. Start high shear mixer at 1500 rpm. As the mixer is running, heat the toluene to 140° F. Once at 140° F., slowly add the 100 grams of DE soil. As the mixer begins to shear, an increased load can be noticed. Start increasing rpm to a 2000, moving toward 2500 rpm when all DE has been added. Run the high shear mixer for 15 minutes after all DE has been added to create a fine dispersion of the DE in the toluene. The toluene turns very black as crude oil is being extracted and the mixer noise may smooth out as the particles begin to decrease in size, forming a small dispersion. After 15 minutes, turn off the mixer and raise the mix head out of the mixture raising head all the way to the full up position of the mixer. Allow the mixture to sit. The DE solids will fall completely to the bottom of the beaker. Allow to settle for 15 minutes. At this time, pour off the toluene+crude oil mixture to a 2000 ml beaker. One will collect several batches in this 2000 ml beaker. Effort should be made to pour off all liquid while leaving the solids in the 1000 ml beaker. In practice, a small amount of very fine material will come with the liquid, which is acceptable, as this can be removed later, e.g. by centrifugation. Centrifuge this liquid to separate the solids. Pour the clean liquid in a container. Remove the solids from the centrifuge tube and add these centrifuged solids to the solids remaining at the bottom of the 1000 ml beaker.

This is now one wash. Repeat the above procedure four more times adding clean toluene each time. After the 5$^{th}$ wash, transfer the solids to a pie tin in a 140° F. oven for 4 hours to evaporate the toluene in the solids. Retort the solids to determine remaining crude in DE. In this example, the extraction process removed 84% of the crude.

Example 4

First Embodiment

The first embodiment is described herein, with the various steps shown in the flowchart of FIG. 1. In step 100, with toluene at room temp (77° F.) to a temp not exceeding 100° F., using a 1000 ml beaker (container #1), add 400 grams of toluene. Optionally add one drop of surfactant (for example nonylphenol) into the toluene. Note that adding the surfactant is optional based on water content in DE. In step 102, place the beaker (container #1) and toluene on stirring hot plate under high shear mixer. The high shear head should have the large hole stator installed. Lower the mixer into the toluene such that the mixing head is about ¼ to ½ inch above bottom of beaker, with the mixing head submerged in the toluene. Start high shear mixer at 1500 rpm (in range of 1000 to 1500 rpm). Heat the toluene to about 140° F. (140° F. min to 160° F. max) while mixing. Once the toluene is in the range, at min of 140° F., slowly add 100 grams of DE soil. As the mixer begins to shear, load is noticed, start increasing rpm to a 2000, moving toward 3000 rpm when all DE has been added. In step 104, run the high shear mixer for 15 to 20 minutes at 3000 rpm after all the DE is in to create a fine dispersion of the DE in the toluene. The toluene will turn very black as crude oil is being extracted. The mixer sound becomes smoother as the DE particles begin to decrease in size forming a small dispersion. After about 15 minutes, in step 106 turn off the mixer and raise the mixing head out of the mixture raising head all the way to the full up position of the mixer. Rinse head with a toluene to clean it. Allow the mixture to settle. The DE solids will fall completely to the bottom of the beaker (container #1). Allow to settle for a minimum of 15 minutes. At this time, in step 108 pour off the toluene crude mixture to a 500 ml beaker (container #2). Try to pour off all liquid while leaving the solids in the 1000 ml beaker (container #1). A little bit of very fine material will come with liquid, which is acceptable as a centrifuge will be used to remove the fine material out of the collected effluent. In step 110, centrifuge the effluent at a minimum of 800 RCF (relative centrifugal force), max of 3000 RCF and place clean toluene crude mixture in a clean container (container #3), and hold for distillation in step 112. Place the recovered solids back in the 1000 ml beaker (container #1) with the original solids for wash 2. In step 114, add 400 grams of clean toluene to the solids in the 1000 ml beaker (container #1). Heat the mixture again to the toluene temp of 140° F. to 160° F. Once at 140° F., mix again at 1500 rpm for 15 minutes. In step 116, immediately pour this entire mixture, solids and all into a 2000 ml Erlenmeyer flash with a vacuum draw (container #4). Allow to settle for 5 minutes. In step 118 add 1200 ml of 140° F. to 160° F. water (pour in) to this mixture. Mix the mixture then allow separate into phases. DE will be at bottom, next the water phase and the crude toluene phase floating on top. Allow to stand 1 hour.

For processing of tar sands, depending on the granule size, there will likely not need any sort of mechanical sizing such as high shear milling, and the process other than elimination of the high shear milling step would be the same as for extracting crude as with DE.

However, for processing of oil shale, which is granitic vs. siliceous, there will most likely require a different method to mechanically size the material as a high shear mill would not be the appropriate equipment to handle the granitic composition.

Phase Separation and Collection

In step 120, using small laboratory clear hose, place end of hose well under the crude toluene layer. Add water through the line causing the crude toluene layer to rise and exit the vacuum port and into a 1000 ml beaker (container #5). In step 122, this collected crude toluene mixture is then centrifuged to remove the trapped fine silt and the clean mixture is added to the first wash centrifuged crude/toluene (container #3). Once all the crude toluene layer has over flowed (with a little water), the remaining water DE mixture is emptied into an 8" pie tin. Pour off the free water, ending up with wet DE in pie tin, place in oven at 150° F. for 4 hours to dry. Retort the DE to determine remaining crude. In this example, 95% of crude was extracted from the DE, which is based on retort test results from DE prior to treatment and after treatment.

Distillation

In step 124, add the clean centrifuged crude toluene mixture to a 2000 ml boiling flask (new container #6, or container #4 used for this purpose). To avoid overflowing, it is preferable not to fill past the half way point of the flask. Start the chilling water through condenser, start the stir bar and start the vacuum (e.g., 28 inch gauge). Heat the mixture to 60° C. Mixture under this vacuum will start producing toluene at 22° C. Going to 60° C. will assure all toluene is recovered into a stream in container in step 126. Perform distillation 2000 ml boiling flask until mixture has stopped boiling and all toluene is collected, leaving clean crude in the 2000 ml boiling flask in step 128. The crude oil is collected for testing.

The process of this embodiment of the invention allows a good recovery yield of the oils to be obtained, i.e., an oil recovery yield higher than or equal to 90%, such yield being calculated with respect to the total quantity of the oils present in the solid matrix by weight, and refers to extracted oil using Retort test results before treatment and after treatment. The process of the invention allows this good recovery yield to be obtained all while operating with a lower energy requirement than prior art systems. Furthermore, the process of the invention results in a final solid residue to be obtained, i.e., a crude deficient solid matrix, with characteristics that allow it to be replaced in situ without the necessity for further treatments.

Referring to FIGS. 2A-2C, there is shown an exemplary setup of steps 118 & 120 wherein water is used to float off the crude oil+toluene layer. In this exemplary setup, a 1000 ml Erlenmeyer flask with vacuum port (container #4) 150 is provided to further separate the toluene+crude oil from the solids during a second wash of the DE oil bearing solids. As shown in FIG. 2A, a small diameter laboratory hose 152 will be placed with its egress end 154 in the flask 150 that has a topmost floating crude/toluene layer 156, an existing water layer 158 that will be below the floating crude/toluene layer 156, and a solid layer 160 at the very bottom 162 of the flask 150. Being careful not to stir up the solid layer 160, water will then be slowly introduced through the hose 152 into the existing water layer 158. The newly introduced water will cause the crude oil/toluene layer 156 to rise up as shown in FIG. 2B. As shown in FIG. 2C, when more water continues to be added, the floating crude/toluene layer 156 will empty out through the vacuum port 164 via a tube 166 connected thereto where it can be further purified as described above with respect to FIG. 1. Once the crude oil/toluene layer 156 is floated out of the vacuum port 164, no more water will be added to the flask 150 via the hose 152. Indeed, this process is unique in that it relies on gravity and other physical characteristics to allow for efficient, low cost separation.

Figure 3A:
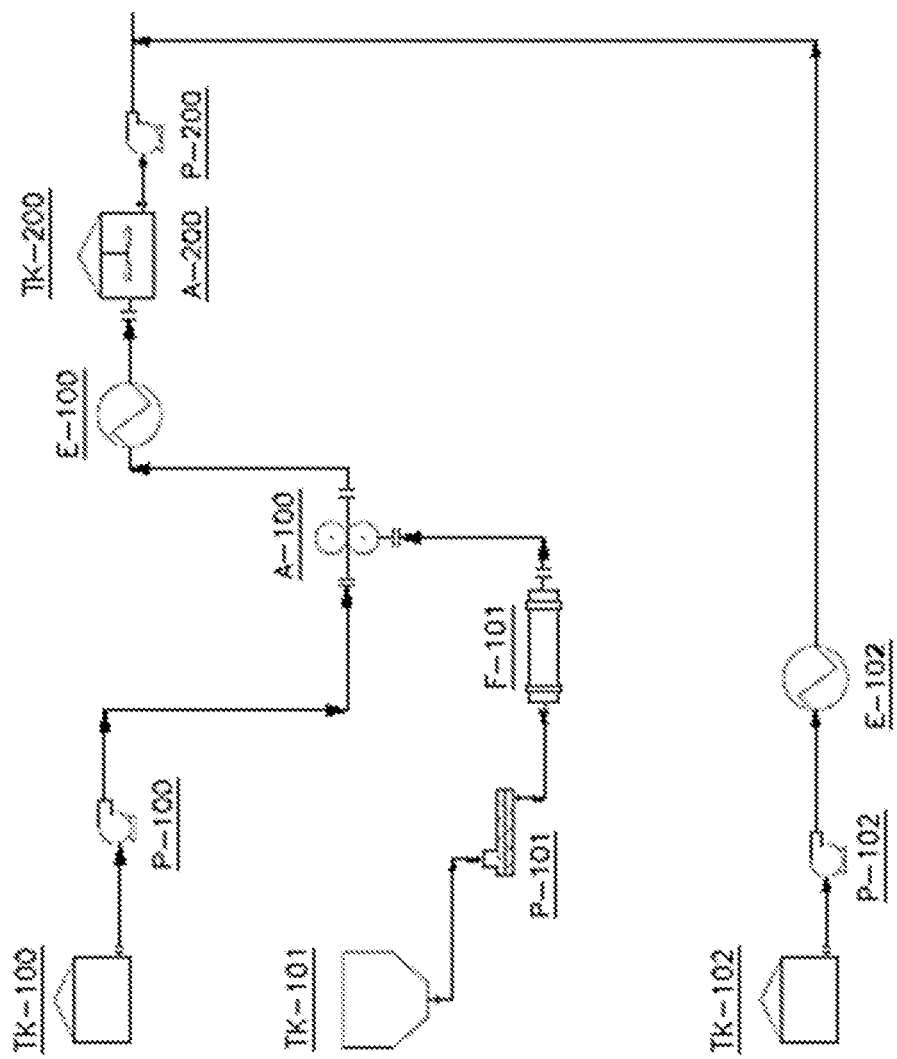
FIGS. 3A-3C are a diagrammatic flow chart showing the various steps of another exemplary embodiment of the invention using solvent to remove crude oil from an oil bearing material.
Figure 3B:
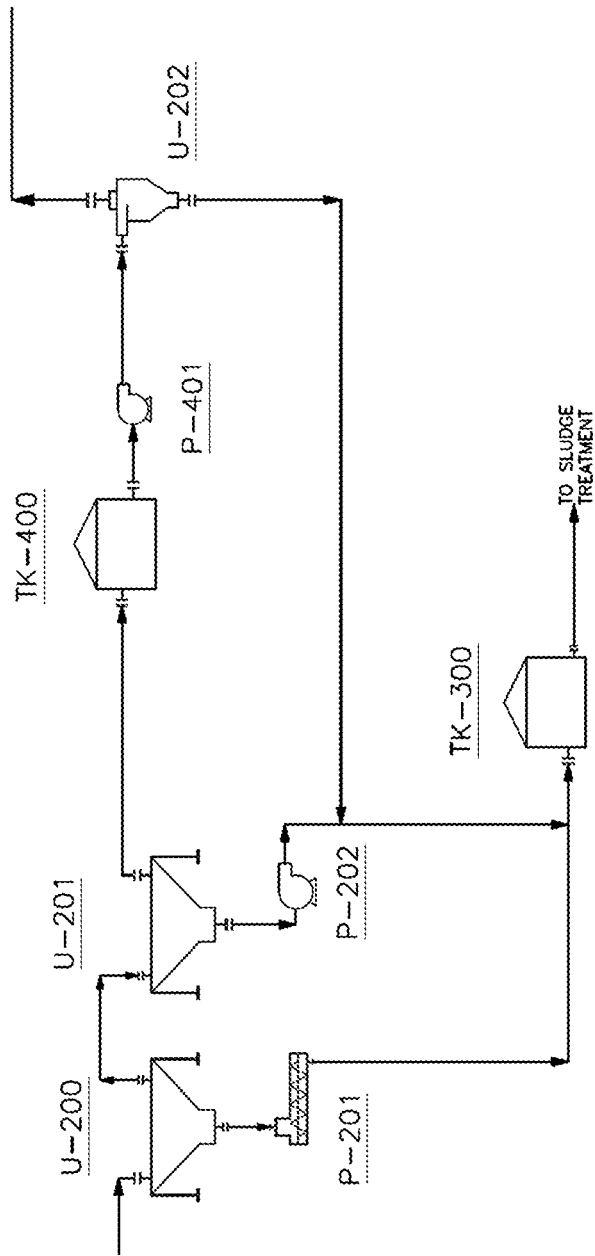
Figure 3C:
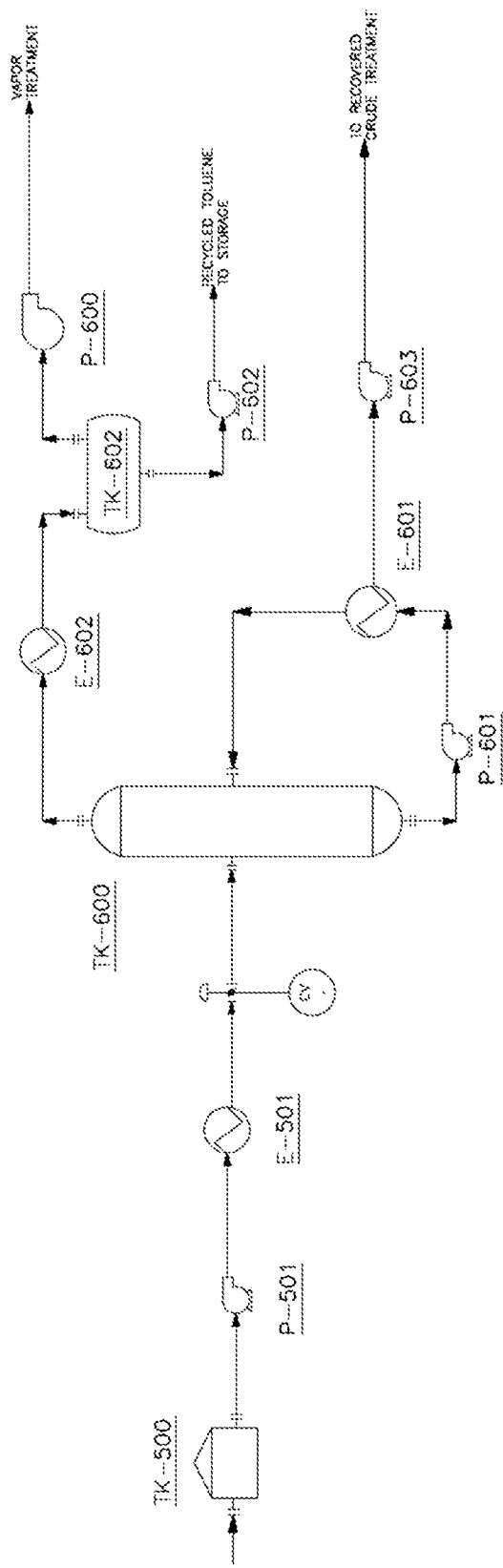

Turning to FIG. 3A-3C, there is shown a flowchart divided into three parts showing another embodiment of the invention. First, a solvent storage tank TK-100 is provided that contains a volume of a preferred solvent used as part of the extraction, such as toluene. Solvent storage tank TK-100 may be at atmospheric pressure. The solvent will preferably be provided at a temperature of about 140° F. to 190° F., and more preferably about 160° F., for reasons discussed below. While toluene is a preferred solvent, other solvents such as xylene, hexane, and heptane can be used. A solvent feed pump P-100 will be used to move the solvent out of the tank TK-100 and into the process. A container, such as a hopper TK-101 is provided to contain a volume of oil-bearing material, such as oil-bearing diatomaceous earth (DE), which oil-bearing DE can be a sludge, wet DE, or dry DE. The DE to be treated is loaded into the hopper TK-101 and is moved out of the hopper with equipment, such as a DE feed auger P-101. If the DE is overly wet, it can be passed through a dryer F-101. Excessively wet DE can likewise be temporarily deposited on a slanted surface so that excess water can naturally drain therefrom. Even if the DE has absorbed some water, so long as the DE is not excessively wet and leaking out excess water, it can be used in the process.

The solvent from tank TK-100 and the DE will preferably be processed and homogenized in a slurry mixer A-100 so that the DE is mixed with the solvent and brought to a correct consistency. As previously noted, the solvent will preferably be provided at a temperature of about 140° F. to 190° F., and more preferably about 160° F. This can be conveniently accomplished by the solvent being heated and stored at the desired temperature in the solvent storage tank TK-100. Likewise, unheated solvent could be passed through an inline heater as it travels from the solvent storage tank TK-100 to the slurry mixer A-100. By using pre-heated solvent at this stage, the solvent will start to dissolve out and mobilize the crude oil contained in the DE particles so that it can escape into the solvent. When using the preferred solvent toluene, the temperate range of 140° F. to 190° F., and more preferably about 160° F. is ideal since it is well below the boiling point at one atmosphere, so avoid the toluene from starting to boil off. In terms of ratios of solvent to DE, the inventors have found that anything less than about a 3:1 ratio of solvent (e.g., toluene) to DE is insufficient to mobilize the crude oil to recover it from the DE, and a ratio of about 4:1 toluene to DE is ideal. While ratios higher than 4:1, e.g., 5;1 and higher also are effective, such higher ratios are unnecessary and result in greater volumes of solvent than are needed. Therefore, the ratio of solvent to DE should be at least 3:1 solvent to diatomaceous earth. After being processed by the slurry mixer A-100, the mixture will be delivered, e.g., via pipes, to a slurry mixture heater E-100 which can optionally be interposed before a high shear mixing vessel TK-200 in order to maintain heating of the homogenized mixture of DE+solvent before it is delivered to the high shear mixing vessel TK-200. A high shear mixer A-200 is used with the high shear mixing vessel TK-200 to mix the pre-homogenized mixture of DE+solvent. It is in the high shear mixing vessel TK-200 that the DE premixed in the solvent will be mixed with a high shear mixer to reduce the DE participles to a very small size range, e.g., about 500 and 100 microns, and with a target particle size is 250 microns (60 mesh). The blending will preferably occur under heat for several minutes, or until the color of the DE and toluene is a dark black, indicating that crude oil has started to be liberated from the DE and to form a thin DE+solvent slurry. It is possible to conduct the shearing under higher than ambient or atmospheric pressure, e.g., in pressure vessels, and if pressure vessels are used, then the temperature of the solvent can be higher than 190° F. as solvent boiling will not occur. It is important to avoid the formation of an emulsion since emulsions resist the separation of oil from water, and therefore, the shearing step should not continue for more than 15 minutes and should discontinue as soon as the color of the DE and toluene turns dark black. It has been found that generally 7 to 9 minutes is a sufficient amount of time for high shearing. As noted above, for processing of tar sands, depending on the granule size, there will likely not need any sort of mechanical sizing such as high shear milling, and the process other than elimination of the high shear milling step would be the same as for extracting crude as with DE. However, for processing of oil shale, which is granitic vs. siliceous, there will most likely require a different method to mechanically size the material as a high shear mill would not be the appropriate equipment to handle the granitic composition. Other than this change, the process would be the same for tar sands and oil shale as for DE.

A separator feeder, e.g., a slurry pump P-200 will pump the slurry out from the high shear mixing vessel TK-200. A water storage tank TK-102 is provided to store water for further processing of the now high sheared DE+solvent mixture, which water is pumped via pump P-102 though an optional feed water cooler E-102. The thusly cooled water is added to the heated DE+solvent slurry downstream from the slurry pump P-200 and the now cooled water+high sheared DE+solvent is further processed, as outlined in FIG. 3B described below. Adding cooled water aids in the separation since it drives the separation of the oil+solvent from the water.

Referring to FIG. 3B, the cooled water+high sheared DE+solvent will be directed to a plate separator U-200. Plate separators are useful to quickly and at high volumes remove a high percentage of solids from a liquid stream. An example of a plate separator includes a lamella clarifier. A lamella clarifiers or inclined plate settler (IPS) is a type of settler designed to remove particulates from liquids and are often employed in primary water treatment in place of conventional settling tanks. Unlike conventional clarifiers, lamella clarifiers use a series of inclined plates. These inclined plates provide a large effective settling area for a small footprint. The inlet stream is stilled upon entry into the clarifier. The processed, solids reduced liquid stream will be sent to an API separator U-201, while the solids that are collected at the bottom of the plate separator U-200 and will be removed with a sludge auger P-201 and moved to a sludge storage tank TK-300. The sludge can be re-treated after de-watering or simply discarded. The API separator U-201 is a gravity separation device designed to separate oil (and oil+solvent) from water and can be used to do so on a continuous flow through basis at high volumes. An example of an API separator U-201 includes the SmartSkim CrossFlow System offered by Universal Separators, Inc. of Madison, Wisc. The water and solids collected by the API separator U-201 will pass out of the bottom of the API separator U-201 and will pumped via a recovery pump P-202 to the sludge tank TK-300. The majority crude oil+solvent plus some water processed by the API separator U-201 does contain some residual suspended solids. The crude oil+solvent+some water+some solids from the API separator U-201 can be collected in a recovered effluent tank TK-400. In order to remove the remaining solids, the crude oil+solvent plus water is process by a cyclone separator U-202. A cyclone feed pump P-401 will deliver the effluent from the recovered effluent tank TK-400 to the input port of the cyclone separator U-202. An example of a cyclone separator that can be used is the Vorspin hydrocyclone, offered by the Compatible Components Corporation of Houston, Tex. The cyclone separator U-202 has an upper output or overflow port for lighter materials, here the crude oil+solvent, plus an underflow port where the remaining solids will pass. The underflow port is connected with pipes to the pipe that is downstream of the recovery pump P-202 that delivers material to the sludge storage tank TK-300. The materials in the sludge tank TK-300 will be processed in a sludge treatment process, which will not be discussed further herein, and which is not the subject of this invention. The lighter materials that exit the upper output or overflow port of cyclone separator U-202 is passed on for further process, as is described with respect to FIG. 3C. The process described in this paragraph is consistent with batch processing. However, with some relatively minor changes to the equipment used and steps, the batch process can readily be changed to a continuous process.

Thus, in such a continuous process, the following changes would be affected. First, instead of first directing the cooled water+high sheared DE+to a plate separator U-200, instead U-200 will be a grit classifier.

Turning to FIG. 3C, the lighter materials that exit the upper output or overflow port of cyclone separator U-202 is passed into a toluene/crude oil surge tank TK-500, which can be at atmospheric pressure. A flash vessel pump P-501 moves the toluene/crude oil through a flash vessel pre-heater E-501 and on to a toluene stripper TK-600. A check value is preferably located between the flash vessel pre-heater E-501 and the toluene stripper TK-600 downstream to prevent backflow. The TK-600 is preferably ASME rated and under vacuum. The toluene vapor that exits the top of the toluene stripper TK-600 is passed through a toluene total condenser E-602 and is directed to a recovered toluene TK-602. Any additional vapors that arise from the recovered toluene knockout tank TK-602 are removed with a vacuum pump P-600 and such vapors are processed by vapor treatment. The toluene stripper, condenser, kettle reboiler, knockout tank, plus distillation towers can be sourced from suppliers such as Cannon Boiler Works, of New Kensington, Pa. A recovered toluene pump P-602 is used to move the collected toluene from the recovered toluene knockout tank TK-602 and are moved to a recycled toluene storage tank (not shown) where the toluene will be available for reuse in the process. The crude oil remaining in the toluene stripper flow over a weir inside a kettle reboiler E-601 and is pumped to crude treatment and a reboil pump P-601 moves crude oil from the bottom of the toluene stripper TK-600 and passes it through a kettle reboiler E-601. The kettle reboiler K-601 is ideally under a vacuum. Any remaining toluene in the crude oil processed by the kettle reboiler K-601 will be routed back to the toluene stripper TK-600 for further reprocessing. The crude oil processed by the kettle reboiler E-601 will be pumped by recovered crude oil pump P-603 downstream for any additional recovered crude oil treatment. The recovered crude oil will be monitoring and possibly treated for the total acid number, metals, chlorides, and total suspended solids.

The pilot plant described by FIGS. 3A-C is designed to produce one barrel per day of oil, and the recovered crude will preferably be pumped into a steel drum capable of withstanding the outlet temperature of the reboiler (200° F.).

Some key processing steps in this embodiment of the invention include using plate separators to remove a large percentage of the crude oil stripped solids from mixture of high sheared oil bearing material+toluene+water to yield mainly crude oil+toluene+water, and then using API separators to remove a large percentage of the water from the crude oil+toluene+water. Thereafter the hydrocyclone will be used to effectively remove the remaining solids from the crude oil+toluene+water. These key steps and other steps are all accomplished using low capital cost, low energy requirement, and high throughput equipment. Thus, the costs, both financial and energy and chemical inputs are very low. The processes and systems of the invention achieve high rates of crude oil removal using relatively less water, less energy, and more environmentally benignly than using prior art methods. Moreover, the resulting solids will have relatively low levels of remaining petroleum products or added chemicals, and can be reused (e.g., when mixed with Portland cement or Pozzlin, a cementitious binder) to refill the extraction site to restore the site to lessen the chance for ground subsiding from occurring.

As noted above, in the processes of the invention described above, the solid, oil bearing material can be mined by water jet technology of a subterranean site. This results in extraction of the solid, oil bearing material in the form of a watery slurry. Since the amount of water in the slurry can be too high for efficient processing, the watery slurry is preferably dewatered prior to being processed by the processes of the inventions.

Furthermore, after crude oil is removed from the solids to form crude reduced solids, the crude reduced solids can be returned to subterranean site without any other materials, or the crude reduced solids can be mixed with other solid materials, such as mining fines and/or cementitious materials in order to increase the total volume and solidify the mixture after being returned to the subterranean site. The preferred embodiments of this invention have been disclosed, however, so that one of ordinary skill in the art would recognize that certain modifications would come within the scope of this invention.

What is claimed is:

1. A process for the above ground extraction of crude oil from oil bearing diatomaceous earth, consisting essentially of:
   (a) mixing a solid, crude oil-bearing diatomaceous earth with a heated solvent at a ratio of at least 3:1 solvent to diatomaceous earth to reduce the size of the solid, oil-bearing diatomaceous earth and release crude oil into the solvent;
   (b) adding water to the size reduced solid and solvent mixture of step (a) to yield a mixture of crude oil+solvent+water+sized reduced diatomaceous earth;
   (c) passing the mixture of crude oil+solvent+water+sized reduced diatomaceous earth from step (b) through a cyclone separator to remove residual diatomaceous earth and to yield crude oil+solvent; and
   (d) passing the crude oil+solvent mixture of step (c) through a solvent stripper to remove solvent from the crude oil and to yield substantially oil-free diatomaceous earth and solvent free crude oil wherein in step (a) the solid, crude oil bearing diatomaceous earth is mixed with the heated solvent by high shear mixing for no more than 15 minutes.

2. The process of claim 1, wherein the mixture of crude oil+solvent+water+sized reduced diatomaceous earth from step (b) is passed through the cyclone separator of step (c) at least twice to enhance the removal of residual diatomaceous earth.

3. The process of claim 1, wherein diatomaceous earth removed from the cyclone separator is further processed to remove any residual crude oil and/or solvent.

4. The process of claim 1, wherein the heated solvent is selected from the group consisting of toluene, xylene, hexane, and heptane.

5. The process of claim 1, wherein in step (a) the heated solvent is toluene and provided at a temperature range of between 140 and 190 F, and preferably about 140 to 160° F. under ambient pressure.

6. A process for the above ground extraction of crude oil from oil bearing diatomaceous earth, consisting essentially of:
   (a) mixing a solid, crude oil-bearing diatomaceous earth with the heated solvent toluene at a ratio of at least 3:1 solvent to diatomaceous earth under high shear mixing to reduce the size of the solid, oil-bearing diatomaceous earth and release crude oil into the solvent, wherein the solvent is at a temperate range of 140° F. to 190° F.;
   (b) adding water to the high sheared and size reduced solid and solvent mixture of step (a) to yield a mixture of crude oil+solvent+water+sized reduced diatomaceous earth;
   (c) passing the mixture of crude oil+solvent+water+sized reduced diatomaceous earth from step (b) through a cyclone separator to remove residual diatomaceous earth and to yield crude oil+solvent; and
   (d) passing the crude oil+solvent mixture of step (c) through a solvent stripper to remove solvent from the crude oil and to yield substantially oil free diatomaceous earth and solvent free crude oil wherein in step (a) the solid, crude oil bearing diatomaceous earth is mixed with the heated solvent by high shear mixing for no more than 15 minutes.

7. The process of claim 6, wherein the mixture of crude oil+solvent+water+sized reduced solids from step (b) is passed through the cyclone separator of step (c) at least twice to enhance the removal of residual diatomaceous earth.

8. The process of claim 6, wherein diatomaceous earth removed from the cyclone separator is further processed to remove any residual crude oil and/or solvent.

9. A process for the above ground extraction of crude oil from a solid, oil bearing diatomaceous earth, consisting essentially of:
   (a) mixing solid, crude oil-bearing diatomaceous earth with a heated solvent at the ratio of at least 3:1 solvent to diatomaceous earth under high shear mixing to reduce the size of the solid, oil-bearing diatomaceous earth and release crude oil into the solvent;
   (b) adding water to the high sheared and sized adding a crude oil-bearing diatomaceous earth and solvent mixture to yield a mixture of crude oil+solvent+water+sized reduced diatomaceous earth;
   (c) passing the mixture from step (b) through a plate clarifier to remove a majority of the sized reduced diatomaceous earth and to yield a mixture of crude oil, solvent and water with some residual sized reduced diatomaceous earth;
   (d) passing the mixture from step (c) through an oil-water separator to product an extracted liquid comprised of crude oil, solvent and some residual diatomaceous earth;

(e) passing the extracted liquid from step (d) through a cyclone separator to remove remaining residual diatomaceous earth and to yield crude oil+solvent; and (f) passing the crude oil+solvent mixture of step (e) through a solvent stripper to remove solvent from the crude oil and to yield substantially oil-free diatomaceous earth and solvent free crude oil wherein in step (a) the solid, crude oil bearing diatomaceous earth is mixed with the heated solvent by high shear mixing for no more than 15 minutes.

10. The process of claim 9, wherein the solvent is selected from the group consisting of toluene, xylene, hexane, and heptane.

11. The process of claim 1, wherein in step (a) the ratio of the solid, crude oil-bearing diatomaceous earth with a heated solvent is at a ratio of at least 4:1 solvent to diatomaceous earth.

12. The process of claim 6, wherein in step (a), the solvent is at a temperate range of approximately 169° F.

\* \* \* \* \*